UNITED STATES PATENT OFFICE.

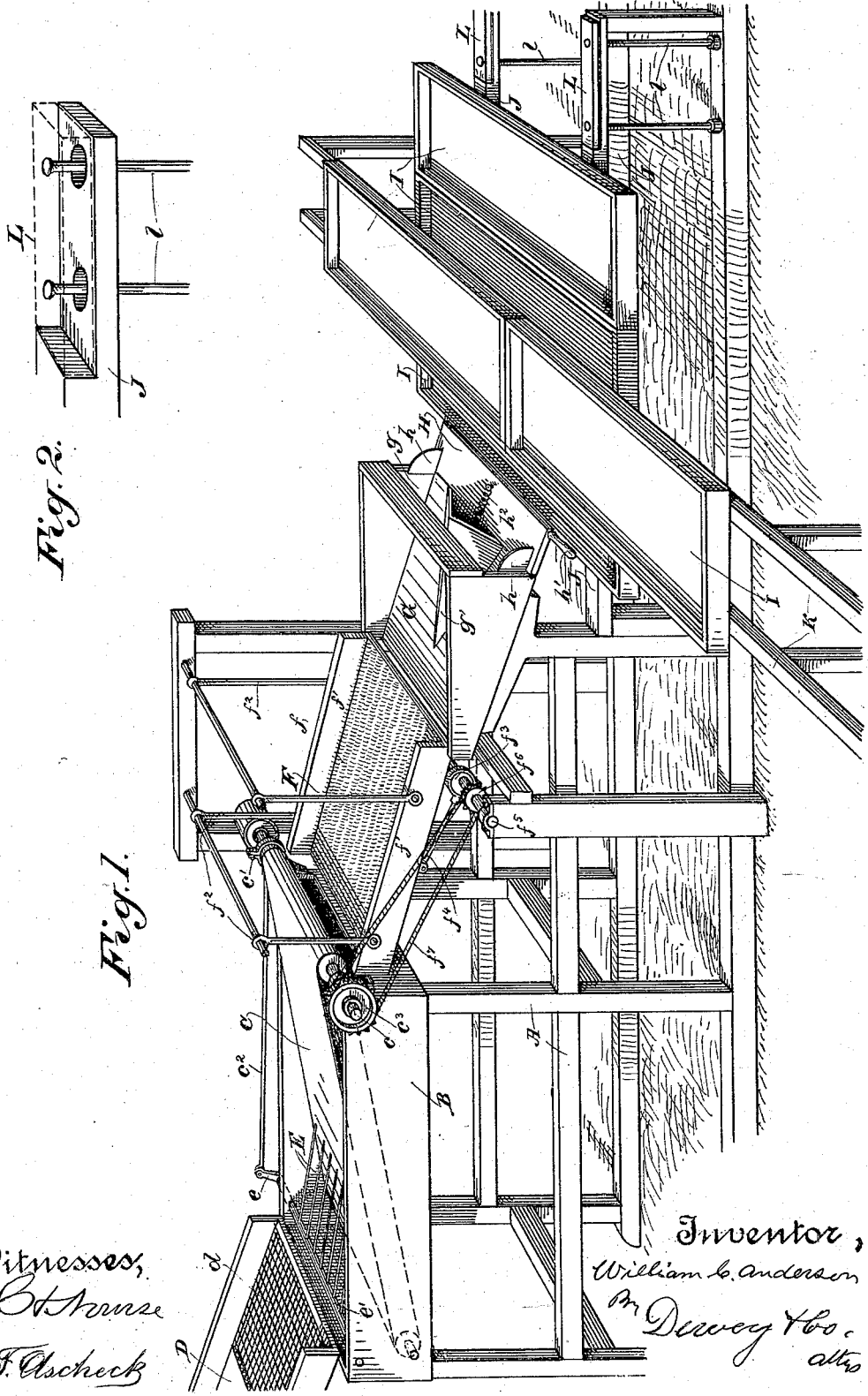

WILLIAM C. ANDERSON, OF SAN JOSÉ, CALIFORNIA.

MACHINE FOR WASHING, PRICKING, AND SPREADING FRUIT.

SPECIFICATION forming part of Letters Patent No. 547,194, dated October 1, 1895.

Application filed September 10, 1894. Serial No. 522,622. (No model.)

*To all whom it may concern:*

Be it known that I, WILLIAM C. ANDERSON, a citizen of the United States, residing at San José, county of Santa Clara, State of California, have invented an Improvement in Machines for Washing, Pricking, and Spreading Fruit; and I hereby declare the following to be a full, clear, and exact description of the same.

My invention relates to the general class of machines for preparing fruit for drying, and especially to a machine which has for its combined object the preliminary washing, the subsequent pricking, and the final spreading of fruit into trays, particular reference being made to the preparation of prunes for the drying process.

The ordinary manipulation of prunes involves the dipping of the fruit into a hot-lye solution, whereby the skins are scalded and broken, so that the juice will exude and cause the proper and rapid drying of the fruit.

Of late years machines have been tried which mechanically puncture or prick the prunes, thus placing them in a condition for drying. These machines have, in one form or another, tables or beds provided with pricking-points, over and in contact with which the prunes are passed. There are, however, objections to these machines. For example, there is a scale upon the prunes, the exudations of which are in the form of a thick sirup or gum which turns black upon exposure. As the prunes are picked and directly placed upon the pricking-table, this gum remains with them and detracts very materially from their salableness. This gum, as well as dirt and trash, clogs up the pricking-points and renders it necessary to clear the pricking-table frequently. Again, many prunes are picked up from the ground and they are covered with dirt, which remains upon them and is dried with them; also the bloom upon them affects their merchantability if it is allowed to remain. In the lye-dipping process these objections do not apply, because the gum, the dirt, and the bloom are all removed by the lye solution; but where the pricking-table is used these all remain, and, as before stated, have heretofore constituted serious objections to the employment of these machines. In my machine these objections are all obviated by the previous washing to which in my machine I subject the fruit, and other advantages are attained, which I shall hereinafter fully describe.

Referring to the accompanying drawings for a more complete explanation of my invention, Figure 1 is a perspective view of my machine. Fig. 2 is a detail of the tray-shaking strips L.

Upon a suitable framework A is constructed a water-tight tank B, in which is mounted an endless traveling draper or carrier C, which is immersed in the water in tank B for the greater portion of its length. Leading to the entrance end of this tank is a feed-chute D, in the exit end of which is a grating $d$ for the purpose of discharging most of the leaves and other débris as the prunes pass over it. Below and in communication with the end of this grating is a series of vibrating fingers E, which extend out over and communicate with the lower end of the traveling carrier C. Communicating with the upper and discharge end of the traveling carrier is a table F, having rising from its surface a number of pricking-points or needles $f$. This table is provided with suitable inclosing sides $f'$, and is mounted upon hangers $f^2$, whereby a shaking motion may be given to it by means which I shall presently describe.

Communicating with the lower end of the pricking-table F is the distributing-hopper G, having an opening $g$ across its entire front. In the center of this opening and extending backwardly into the hopper is the inclined directing rib or piece $g'$. Hinged to the discharge end of the hopper is a gate H, having side shields $h$ playing into the hopper, and having also a handle $h'$ and a controlling-spring $h^2$. This spring is under such tension as to counterbalance the gate H and hold it in whatever position to which it may be turned. When in a horizontal position it opens the mouth of the hopper, and when turned upwardly to a vertical position it closes the same. The end shields $h$ prevent the fruit from being crushed or jammed when the gate is closed. Directly under the gate are the trays I. These trays are mounted and manipulated as follows: They rest primarily upon supporting-bars J. Over these bars and extending to any distance are the track-bars K. Upon these track-bars K a number of trays I are placed, and the whole series is shoved up by contact with one another until the bars are full. Then one of the trays I on the bars J, having been filled with prunes from the gate H, is moved over on the bars J by a second tray, which is lifted down from the track-bars K by hand and placed against its side and forced over until it—namely, the fresh tray—lies under the gate H and is ready to receive its charge. When this tray is filled, another tray is lifted from the runway-bars K and the operation is repeated.

Now, in order to shake the trays I, so that their contents shall be spread out evenly and without handling, I have upon the ends of the bars J the movable pieces or strips L. These are let into mortises in the bars J and are flush with the top thereof, so that the trays may be pulled over onto them easily. They are carried free of the bars J by means of the upright spring-supports $l$, which are secured to them and pass down freely in elongated slots in the said bars J and are secured below. Now, when a tray has been moved to rest upon the strips L, it can be shaken back and forth, the strips L moving with the tray and permitting it to be moved, so that the fruit in the tray will settle down into proper level and be well distributed without handling.

The operation of the machine is as follows: The prunes being fed into the chute D pass down and much of the débris is separated from them by falling through the grating $d$. The prunes then fall upon the vibrating fingers E, by which they are directed onto the lower end of the traveling carrier C. The fingers and the traveling carrier C being submerged the fruit is also immersed. The water in the tank B, though it may be cold, is preferably used hot. What débris still remains with the prunes is shaken off positively by the agitation and movement of the fingers E and falls down in the tank B. The fruit, being thus agitated in the water and remaining therein during its progress on the traveling carrier, is entirely freed of its coating of gum or of dirt, and its bloom is removed, so that it is perfectly clean when it reaches the top of the draper. In addition to this action the water has a tendency to swell up the more imperfect specimens and make them plumper. It also tends to render their skins more tender for the subsequent action of the pricking-pins. The fruit is then delivered upon the pricking-table, by which the skins are punctured. Then it is discharged into the distributing-hopper G and is well spread out by the directing-rib $g'$, and passes over the gate H into an underlying tray I. When one tray is full and another one is being put in its place, the gate H is raised to close the opening of the hopper G, which always contains a supply ready to be discharged through said opening.

The draper C is driven by means of a shaft $c$, to which a rotary motion may be imparted by any suitable means. Upon the shaft is an eccentric $c'$, from which an eccentric strap and link $c^2$ extends to a crank $e$ on the rocking head $e'$ of the agitating-fingers E, whereby said fingers are vibrated.

The shaking table has its motion imparted to it by means of an eccentric $f^3$ and link $f^4$. The eccentric is on a shaft $f^5$, to which power is applied by means of a sprocket-pulley $f^6$, receiving a chain $f^7$ from a sprocket-wheel $c^3$ on the shaft $c$.

Having thus described my invention what I claim as new, and desire to secure by Letters Patent, is—

1. In a machine for preparing fruit for drying, the combination of means for first washing the fruit, with means at the discharge end of and connected with the washing devices for puncturing the skin after the fruit is washed, substantially as herein described.

2. In a machine for preparing fruit for drying, the combination of a water containing receptacle, means for immersing the fruit in the water of said receptacle, and delivering it therefrom, and means connected with the discharge end of the washing mechanism for puncturing the skins of said fruit, substantially as herein described.

3. In a machine for preparing fruit for drying, the combination of a water containing receptacle, means for immersing the fruit in the water of said receptacle, and delivering it therefrom, and means connected with the discharge end of the washing mechanism for puncturing the skins of said fruit, consisting of a pricking bed or surface to which the fruit is delivered, substantially as herein described.

4. In a machine for preparing fruit for drying, the combination of a water containing receptacle, a traveling carrier immersed in the water in said receptacle and adapted to receive and convey the fruit through the water, and a bed or surface at the discharge end of the carrier for receiving the fruit therefrom, and having pricking points to which the fruit is delivered by the traveling carrier whereby the skins are punctured, substantially as herein described.

5. In a machine for preparing fruit for drying, the combination of a water receptacle, a traveling carrier immersed therein, vibrating fingers in the water receptacle and adapted to deliver the fruit to the carrier and a pricking bed or surface to receive the fruit from the carrier to puncture the skin, substantially as herein described.

6. In a machine for preparing fruit for drying, the combination of a water receptacle, a traveling carrier immersed therein, vibrating fingers in the receptacle adapted to deliver the fruit to the carrier, a feed chute having a grating in communication with the fingers, and a pricking bed or table by which the fruit is punctured, substantially as herein described.

7. In a machine for preparing fruit for drying, the distributing hopper having a discharge opening at one end, a centrally inclined directing rib and a gate hinged to said discharge end adapted to open the discharge of the hopper when in a horizontal position, and to close the same when turned to a vertical position.

8. In a machine for preparing fruit for drying, the distributing hopper having a discharge opening and centrally directing rib, a gate hinged to said discharge end for closing the same when the gate is in a vertical position, and opening the same when the gate is lowered into a horizontal position, and a spring connected with the gate for counterbalancing it in whatever position it is turned.

9. In a machine for preparing fruit for drying, the distributing hopper G having its opening $g$, and a centrally inclined directing rib $g'$, and the spring gate hinged to the discharge end of the hopper adapted to be turned to a vertical position to close said opening, and into a horizontal position to open the same, said gate having the end shields $h$, substantially as herein described.

10. In a machine for preparing fruit for drying, the combination of the water receptacle, the endless traveling carrier immersed therein, means for feeding the fruit to the carrier, a pricking table or bed in open communication with the discharge end of the carrier adapted to receive the fruit from the carrier and to puncture its skin, and the distributing hopper G in communication with the pricking table, said hopper having the discharge opening with the inclined distributing rib and the spring-controlled gate for opening and closing the discharge opening of the hopper, substantially as herein described.

11. A machine for washing, pricking and spreading fruit, consisting of a feed chute with a grating to remove the débris, vibrating fingers to which the fruit is delivered by the chute, a tank containing water in which the vibrating fingers are immersed, a traveling draper or carrier immersed in the water of the tank and adapted to receive the fruit from the fingers, a pricking table or bed in open communication with the discharge end of the carrier for receiving the fruit from the carrier and puncturing its skins, and the distributing hopper G receiving the fruit from the pricking table, said hopper having the inclined rib, the feed opening and the controlling gate for opening and closing the opening, substantially as herein described.

12. In a machine for preparing fruit for drying, the bars J upon which the trays are supported while receiving the fruit and the track bars K over the bars J for receiving the supply of trays, substantially as herein described.

13. In a machine for preparing fruit for drying, the supporting bars for the filled trays of fruit, in combination with the movable strips L on said bars adapted to receive the trays and to permit them to be shaken, substantially as herein described.

14. In a machine for preparing fruit for drying, the supporting bars for the filled trays of fruit, in combination with the sliding strips L on said bars adapted to receive the trays and to permit them to be shaken, said bars being supported on spring rods, substantially as herein described.

In witness whereof I have hereunto set my hand.

WILLIAM C. ANDERSON.

Witnesses:
S. H. NOURSE,
H. F. ASCHECK.